No. 632,092. Patented Aug. 29, 1899.
W. J. BREWER.
MEANS FOR REDUCTION OF FRICTION OF AXLES AND JOURNALS.
(Application filed May 3, 1899.)
(No Model.)
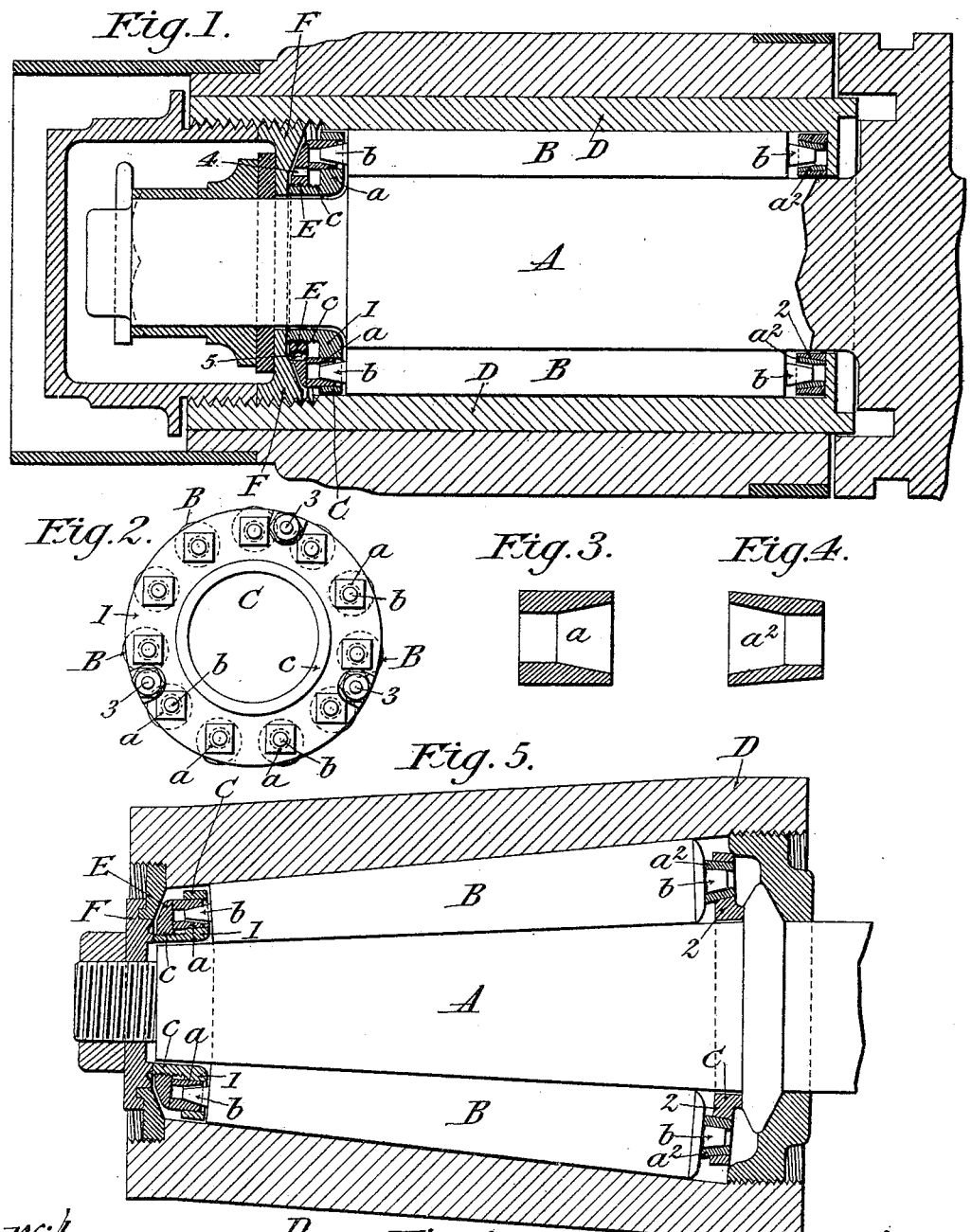

UNITED STATES PATENT OFFICE.

WILLIAM J. BREWER, OF LONDON, ENGLAND, ASSIGNOR OF ONE-HALF TO WILLIAM A. SIMMONS, TRUSTEE, OF NEW YORK, N. Y.

MEANS FOR REDUCTION OF FRICTION OF AXLES AND JOURNALS.

SPECIFICATION forming part of Letters Patent No. 632,092, dated August 29, 1899.

Application filed May 3, 1899. Serial No. 715,447. (No model.)

*To all whom it may concern:*

Be it known that I, WILLIAM JOHN BREWER, C. E., a subject of the Queen of Great Britain and Ireland, and a resident of the city of London, England, have invented a new and useful Improvement in Means for the Reduction of Friction of Axles and Journals, of which the following is a specification.

This invention relates to the reduction of the friction of axles and journals, such as the axles of cabs and like vehicles, those of railway and tramway rolling-stock, engine and propeller shafts, ships' pulleys and other hoisting-blocks, and the like.

The invention consists in improved means for cradling antifriction-rollers, whereby the rollers of a given journal are adapted not only to be removed and handled, together with their revolving cradle, as one piece, but are rendered capable of being adjusted at any time to take up wear and insure true and frictionless motion, and the improved bearings are provided with bushes or equivalent parts, preferably and conveniently of antifriction metal, to which wear is confined, that can be quickly and inexpensively replaced by new parts when the limit of adjustment is reached.

The present invention further consists in a specific embodiment of the principle above stated especially designed as a roller-bearing for the axles of cabs and like vehicles and in certain novel combination of parts embodied in said specific roller-bearing.

A sheet of drawings accompanies this specification as part thereof.

Figure 1 of the drawings is a small-scale longitudinal section through an axle-box and improved roller-bearing for a cab-axle, illustrating said invention. Fig. 2 is an end view of the rollers and their cradle detached. Figs. 3 and 4 are enlarged sectional views, respectively, of one of the slidable bushes and one of the fixed bushes shown in Figs. 1 and 2. Fig. 5 is a small-scale longitudinal section through a cab-axle box provided with a modified roller-bearing, and Fig. 6 is a portion of the latter enlarged one diameter.

Like letters and numbers refer to like parts in all the figures.

In any embodiment of the principle which is the leading part of this invention the axle spindle or journal A is surrounded by antifriction-rollers B, extending lengthwise of the journal and mounted in a revolving frame or "cradle" C, composed of end rings 1 and 2 and connecting-rods 3, so that the rollers and cradle may be together removed from within the axle-box D. Said end rings are provided with renewable bushes $a$ and $a^2$ or equivalent parts to which wear is confined, preferably and conveniently of Babbitt metal or the like, for the individual pivots $b$ of the rollers, the wear parts for each ring at least being interchangeable, and provision is made for taking up wear by adjustment until said renewable parts are worn out or a given limit is reached.

In the specific roller-bearing represented by Figs. 1 to 4, inclusive, the renewable wear parts $a$ and $a^2$ are in the form of non-rotary bushes, respectively slidable and fixed, the slidable bushes having parallel sides and fitted to corresponding holes in the outer ring 1 of the cradle C and the fixed bushes being tapered externally and fitted to tapered holes in the end ring 2. The roller-pivots $b$ are tapered, and the bushes $a$ and $a^2$ are correspondingly tapered internally to facilitate adjustment. The end ring 1 has a crown flange or hub $c$ at its inner diameter that is screw-threaded externally to coact with an embracing screw-ring E, by which the slidable bushes $a$ and the rollers as a whole are simultaneously adjusted to take up wear. The screw-ring E has a pair of holes 4 and 5 to coact with a pin-hole spanner, by which it is conveniently turned to press inward the bushes $a$. If there be any looseness at the bushes $a^2$, the rollers yield endwise and take up the wear at this point as the bushes $a$ are adjusted. The cradle C is held in place within the axle-box by an annular check-plate F, Fig. 1, removable by a spanner. After this plate is removed the roller-bearing may be adjusted *in situ*, or the cradle and rollers may be withdrawn endwise from within the axle-box to renew the bushes $a$ and $a^2$.

In the modification represented by Figs. 5 and 6, the axle-spindle A being tapering, the rollers B are conical and the end rings 1 and 2 of the cradle C of different diameters. Otherwise the two arrangements are substantially alike, a screw-ring E on the hub of the larger end ring 1 coacting with slidable bushes $a$ in this end ring and through the medium of these bushes $a$ tightening the pivots $b$ of the several rollers within renewable fixed bushes $a^2$ in the end ring 2 and an annular check-plate F securing the united and adjusted rollers and cradle in working position.

Details of the axle-boxes and their appurtenances (shown in Figs. 1 and 5) that have not been described form no part of my present invention and may be of any known or improved forms.

An important advantage of the improved roller-bearing is its adaptation to be made without drilled or milled bearings for the individual rollers.

The end rings may be iron or brass castings, and the renewable wear parts, being of relatively soft metal, are given all necessary surfacing by the molds in which they are cast, so that they require no machining whatever.

The wear parts in the form of bushes may have any non-circular shape externally—as square, triangular, hexagonal, &c.—provided that those of each end ring should in all cases be interchangeable. In some forms of bearing both end rings may be provided with slidable bushes and adjusting-rings. The rollers of each bearing may be of any suitable number, and other like modifications will suggest themselves to those skilled in the art.

I do not claim herein, except generically, interchangeable and renewable wear parts in the form of bushes withdrawable outwardly from the end rings of a roller-cradle, but not slidably adjustable. Wear parts of this description are set forth and claimed in a companion specification forming part of my application for patent filed May 4, 1899, Serial No. 715,587.

Having thus described said improvement, I claim as my invention and desire to patent under this specification—

1. As improved means for the reduction of the friction of axles and journals, a roller-bearing comprising longitudinal antifriction-rollers, a revolving cradle uniting said rollers and removable therewith, means for adjusting the rollers to take up wear, and renewable parts to which wear is confined and that may be renewed when worn out.

2. As improved means for the reduction of the friction of axles and journals, a roller-bearing comprising longitudinal antifriction-rollers, a revolving cradle uniting said rollers and removable therewith, renewable parts to which wear is confined and means for simultaneously tightening the rollers by adjustment to take up wear.

3. The combination, in a roller-bearing, of longitudinal antifriction-rollers, a cradle comprising a pair of end rings and rods that rigidly unite said end rings, an adjusting device carried by one of said end rings, and slidable bushes for the adjacent pivots of the several rollers carried by this end ring and movable by said adjusting device to take up wear.

4. The combination, in a roller-bearing, of longitudinal antifriction-rollers, a cradle comprising a pair of end rings and rods that rigidly unite said end rings, an adjusting device carried by one of said end rings, slidable bushes for the adjacent pivots of the several rollers carried by this end ring and movable by said adjusting device, and fixed renewable bushes carried by the other end ring.

5. In a roller-bearing, the combination of longitudinal antifriction-rollers, a cradle for said rollers comprising a pair of end rings and rods that rigidly unite said end rings, a screw-ring carried by one of said end rings, slidable bushes for the adjacent pivots of the several rollers carried by this end ring in contact with said screw-ring, and renewable bushes carried by the other end ring, substantially as hereinbefore specified.

W. J. BREWER.

Witnesses:
 JAS. L. EWIN,
 ARTHUR C. FOWLE.